United States Patent [19]
Kim

[11] Patent Number: 5,475,541
[45] Date of Patent: Dec. 12, 1995

[54] APPARATUS FOR DETECTING AN OPERATION MODE OF A TAPE CASSETTE PLAYER AND ALSO WHETHER A TAPE CASSETTE IS AVAILABLE FOR RECORDING

[75] Inventor: Kwang B. Kim, Suwon, Rep. of Korea

[73] Assignee: Samsung Electronics Co., Ltd., Kyungki-do, Rep. of Korea

[21] Appl. No.: 285,038

[22] Filed: Aug. 2, 1994

[30] Foreign Application Priority Data

Nov. 23, 1993 [KR] Rep. of Korea ............... 93-25009

[51] Int. Cl.⁶ .................. G11B 15/04; G11B 15/12; G11B 5/10
[52] U.S. Cl. .................. 360/60; 360/128; 360/61
[58] Field of Search .................. 360/60, 61, 93, 360/132, 134, 128, 137

[56] References Cited

U.S. PATENT DOCUMENTS

| | | |
|---|---|---|
| 4,106,064 | 8/1978 | Hoshido .................. 360/60 |
| 4,607,299 | 8/1986 | Oishi et al. .................. 360/60 |
| 4,760,473 | 7/1988 | Takikawa et al. .................. 360/60 |

*Primary Examiner*—Aristotelis Psitos
*Assistant Examiner*—W. Chris Kim
*Attorney, Agent, or Firm*—Sughrue, Mion, Zinn, Macpeak & Seas

[57] ABSTRACT

An apparatus for detecting an operation mode of a player and whether or not a tape cassette loaded into the player is recordable. The apparatus includes a cam plate having a cam groove operated to switch the player mode, a switching element, a switching arm member for operating the switching element depending on the movement of the cam groove, and a sensor lever which pivots depending on the presence of the erase-prevention tab of the tape cassette and limits the switching arm member in one direction. An extended groove is formed in the cam plate so as to detect a recording mode, and the extended groove is selectively moved by the switching arm member depending on the pivotal location of the sensor lever. That is, an operation mode of the player and an erase-prevention tab of a tape cassette can be detected by a single switching element, to thereby simplify the player structure and reduce the cost.

5 Claims, 4 Drawing Sheets

APPARATUS FOR DETECTING AN OPERATION MODE OF A TAPE CASSETTE PLAYER AND ALSO WHETHER A TAPE CASSETTE IS AVAILABLE FOR RECORDING

BACKGROUND OF THE INVENTION

The present invention relates to an apparatus for detecting an operation mode of a tape cassette player into which a cassette tape is loaded so as to record and reproduce information and, more particularly, to an apparatus for detecting an operation mode of a tape cassette player which can also detect whether the tape cassette loaded into the player is available for recording.

For example, as shown in FIG. 1, a tape cassette used for a video tape cassette recorder comprises a groove 2 formed in one side of the rear body of a cassette 1 and an erase-prevention tab 3 formed to obstruct groove 2. That is, a tape cassette having erase-prevention tab 3 is available for recording by the operation of a player, while a tape cassette in which erase-prevention tab 3 has been removed cannot be used for recording.

A player which employs tape cassette 1 comprises means for allowing or prohibiting a recording mode by detecting whether the erase-prevention tab 3 is present. That is, the purpose of providing the means for allowing or prohibiting a recording mode is to prevent the unintentional erasure of information due to user error, for example, via player misoperation.

Meanwhile, a cassette player comprises a mode discriminator for recognizing the current state of the deck mechanism for driving a tape cassette, and for precisely changing the state to a desired mode when a user wants another mode.

FIG. 2 roughly illustrates the related components provided in a conventional VCR deck mechanism. The VCR deck mechanism comprises an erase-prevention sensor lever 5 which is tension-biased by a spring 6 so as to contact erase-prevention tab 3 and pivot-supported so as to change the rotating location depending on the presence of erase-prevention tab 3 in one side of a deck 4, and a switch 7 which opens or closes a switching contact by interlocking with erase-prevention sensor lever 5. That is, when erase-prevention tab 3 is attached to tape cassette 1 loaded into deck 4, a protruding portion 5a of sensor lever 5 is pushed back. On the contrary, the removal of erase-prevention tab 3 allows protruding portion 5a of sensor lever 5 to be inserted into groove 2, so that the rotating location of sensor lever 5 changes in accordance with the presence or absence of erase-prevention tab 3. Thus, switch 7 is operated by an extending portion 5b of detecting lever 5. Accordingly, the tape player allows or prohibits a recording mode depending on whether the contact of switch 7 is opened or closed.

Moreover, referring to FIG. 2, a motor 8 is installed at one side so as to change the state of the deck mechanism depending on the deck mechanism mode, a master gear 9 rotates by the operation of motor 8, and a slide member 10 moves by the operation of master gear 9. The deck mechanism is changed to a state where each operation mode can be performed in accordance with the degree of the movement of slide member 10.

In the above-noted deck mechanism, the changed or converted operation mode can be discriminated by detecting the distance of the movement of slide member 10. Since slide member 10 moves by the rotation of master gear 9, the converted operation mode can be discriminated by detecting a rotation angle of master gear 9. Accordingly, in the deck mechanism, as shown in FIG. 2, an operation mode of the master gear 9 depending on a rotation angle is recognized by installing a rotary-type switch 11 on master gear 9.

In the technique as described above, the product cost is higher due to the increased number of parts and the resulting increased working time, since the two separate switches 7 and 11 are needed in order to detect whether the erase-prevention tab of a cassette tape is removed and to discriminate the operation mode of a deck mechanism.

SUMMARY OF THE INVENTION

Accordingly, it is an object of the present invention to provide an apparatus for detecting an operation mode of a tape cassette player which can also sense the presence or absence of an erase-prevention tab by employing a single switch.

To accomplish the above object, there is provided an apparatus for detecting an operation mode of a tape cassette player having a slide member moved so as to change the operation mode, and for detecting a tape cassette having a removable erase-prevention tab so as to perform a predetermined function in accordance with the selected operation mode, the apparatus comprising:

a switching element for generating a switching signal;

first operating means for operating the switching element by being interlocked to the slide member so that the switching element can generate a first signal by which the operation mode can be discriminated; and second operating means for operating the switching element by being interlocked to the erase-prevention tab so that the switching element can generate a second signal for detecting whether the erase-prevention tab is present.

According to the present invention, a single lever type switch (for example, a micro-switch or a limit switch) can replace both the mode-recognizing rotary-type switch and the erase-prevention sensor switch. The switch employed by the present invention has one or more contacts so as to recognize a plurality of modes.

BRIEF DESCRIPTION OF THE DRAWINGS

Other features and advantages of the present invention will be apparent from the following description taken in connection with the accompanying drawings wherein.

DETAILED DESCRIPTION OF THE PREFERRED EMBODIMENT

The present invention will be explained in more detail with reference to the attached drawings.

Figure 3:
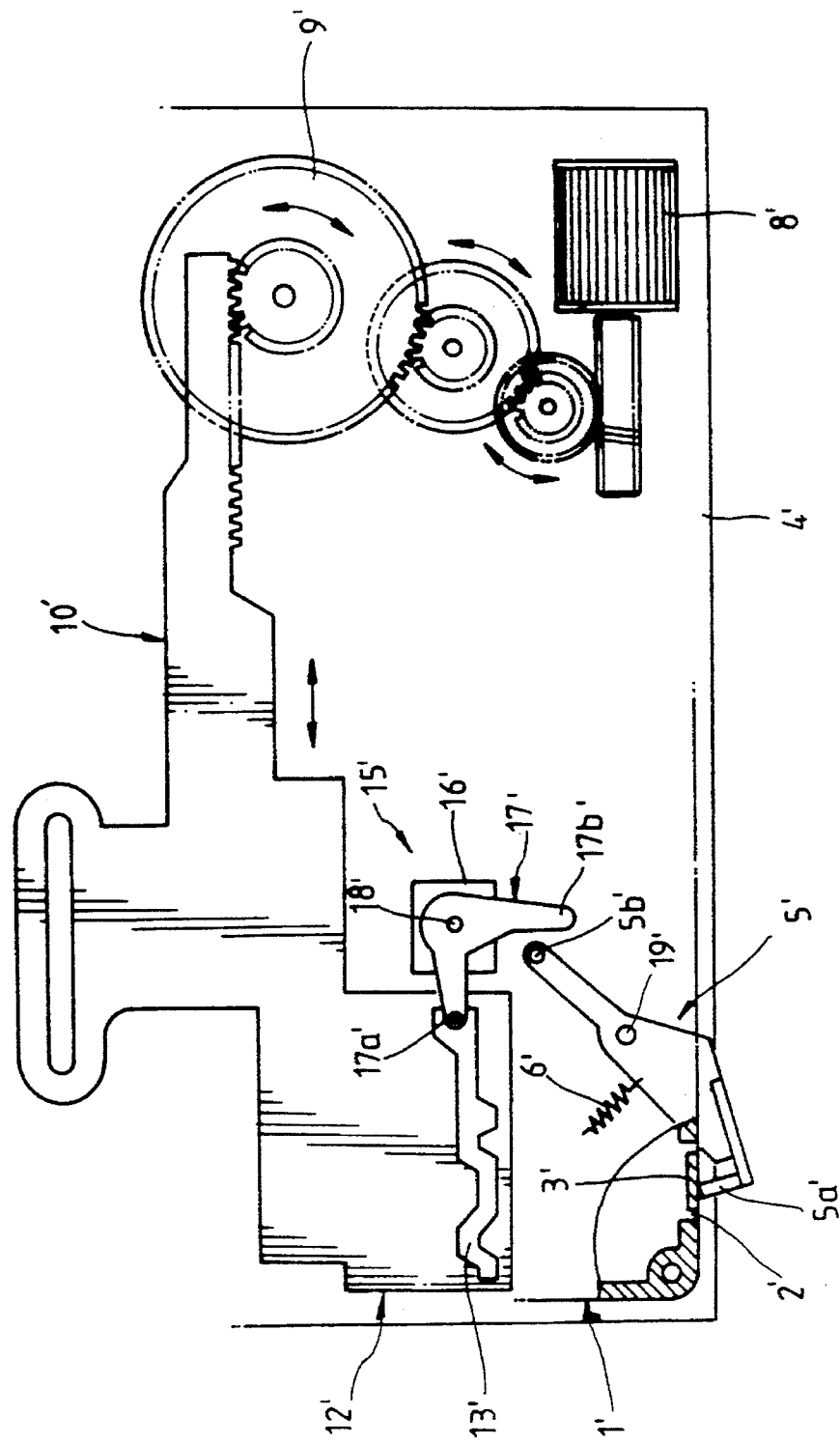
FIG. 3 is a plan view showing an apparatus for detecting an operation mode of a tape cassette player and also the presence or absence of an erase-prevention tab according to the present invention.

Referring to FIG. 3, reference numeral 4' denotes a deck whereon a head drum (not shown) and a reel driving table (not shown) are installed. A tape cassette 1' is loaded into the reel driving table. Deck 4' comprises a motor 8' installed at one side thereof so as to generate a force, a master gear 9' which rotates by the operation of motor 8', and a slide member 10' which laterally moves in a straight line according to the rotation of master gear 9'.

An extended cam plate 12' is provided to one side of slide member 10'. An elongated cam groove 13' extending in a sliding direction of cam plate 12' is formed in cam plate 12' so as to have variable positions or locations perpendicular to the sliding direction. An extended groove 14' is formed in a predetermined area of cam groove 13', for example, such that a reproducing mode can be recognized (see FIGS. 4A and 4B).

In deck 4', a sensor lever 5', for detecting an operation mode and the presence of erase-prevention tab 3' of tape cassette 1' loaded onto deck 4', is installed with a switching element 15'. First, switching element 15' includes a body 16' provided with at least one switching contact (not shown), and a switching arm member 17' which is supported by a pivot 18' and provided on body 16' so as to be rotatable. A first end portion 17a' of the switching arm member 17' is inserted into cam groove 13' formed in cam plate 12' so that first end portion 17a' can move into variable positions or locations of cam groove 13' according to the movement of slide member 10'. Thus, switching element 15' outputs a switching signal depending on the rotation of switching arm member 17'.

Figure 4A:
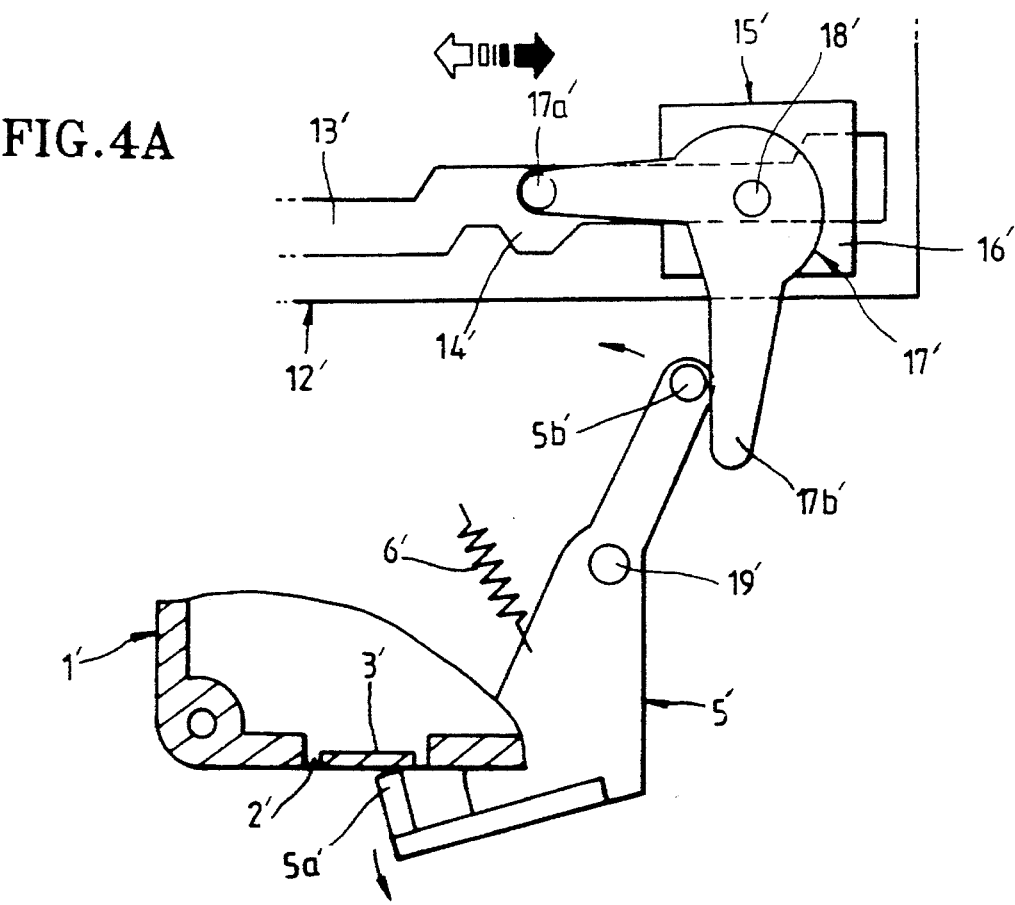
FIG. 4A is a plan view showing a portion of a recordable tape cassette loaded into an apparatus for detecting an operation mode of a tape cassette player of the present invention.

Referring to FIG. 4A, sensor lever 5' is supported by pivot 18' onto deck 4' to be rotatable thereon. Sensor lever 5' includes a protruding portion 5a' which can contact erase-prevention tab 3' of tape cassette 1' loaded onto deck 4', and an extending portion 5b' which extends to deck 4' so as to contact a second end portion 17b' of switching arm member 17' of switching element 15'. Spring 6' provides a force to rotate sensor lever 5' such that protruding portion 5a' is held back by erase-prevention tab 3', and simultaneously, extending portion 5b' can push on second portion 17b' of arm member 17'.

Here, protruding portion 5a' of sensor lever 5' is always in contact with erase-prevention tab 3', but extending portion 5b' may or may not be in contact with second end portion 17b' of switching arm member 17'. Here, if erase-prevention tab 3' of cassette tape 1' is removed, extending portion 5b' contacts second end portion 17b' so as to push second end portion 17b' while protruding portion 5a' is inserted into groove 2' of tape cassette 1'. Accordingly, first end portion 17a' of switching arm member 17' of switching element 15' does not move along extended groove 14' of cam groove 13' when cassette 1' having erase-prevention tab 3' is loaded. On the contrary, if erase-prevention tab 3' is removed, switching arm member 17' receives a force enabling first end portion 17a' to move into extended groove 14'.

According to the present invention, the rotating location of switching member 17' is changed according to the variable locations of cam groove 13', and a changed operation mode of a deck mechanism can be discriminated by the signal of switching element 15' generated depending on the rotating location.

Figure 4B:
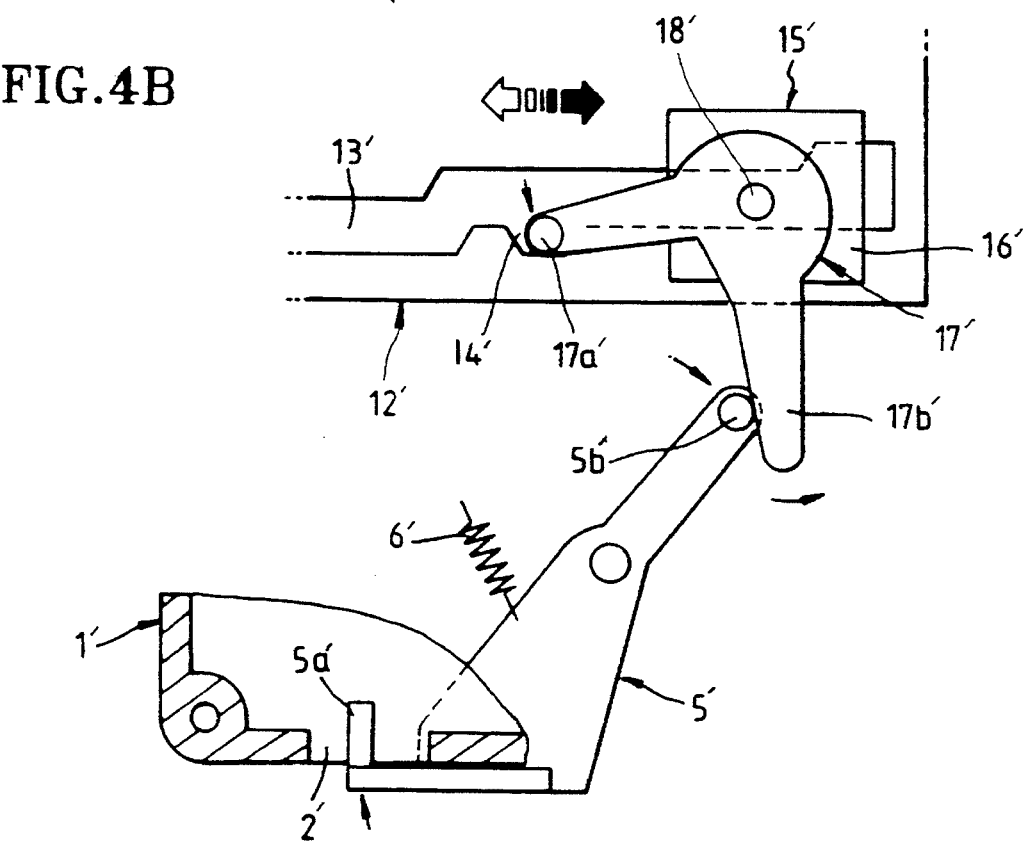
FIG. 4B is a plan view showing a portion of a non-recordable tape cassette loaded into an apparatus for detecting an operation mode of a tape cassette player of the present invention.

As shown in FIGS. 4A and 4B, the device of the present invention performs an erase-prevention sensing function in extended groove 14' in order to recognize the reproduction mode of cam groove 13'.

That is, as shown in FIG. 4A, when deck 4' provided with cassette 1' having erase-prevention tab 3' is changed to a reproducing mode, protruding portion 5a' of sensor lever 5' is held back by erase-prevention tab 3' and extending portion 5b' and second end portion 17b' of switching arm member 17' become separated from each other. Thus, first end portion 17a' of arm member 17' does not move along extended groove 14' of cam groove 13' and it is recognized that cassette 1' is one intended for recording, by using the thus-generated signal of switching element 15'.

On the contrary, as shown in FIG. 4B, when tape cassette 1' where erase-prevention tab 3' is removed is loaded, protruding portion 5a' of sensor lever 5' is inserted into groove 2' of tape cassette 1' while extending portion 5b' pushes second end portion 17b' of switching arm member 17' in the counterclockwise direction. Accordingly, first end portion 17a' of switching arm member 17' moves along extended groove 14' of cam groove 13'. The signal of switching element 15' generated at this time indicates the state wherein the recording onto cassette 1' is prohibited.

Figure 1:
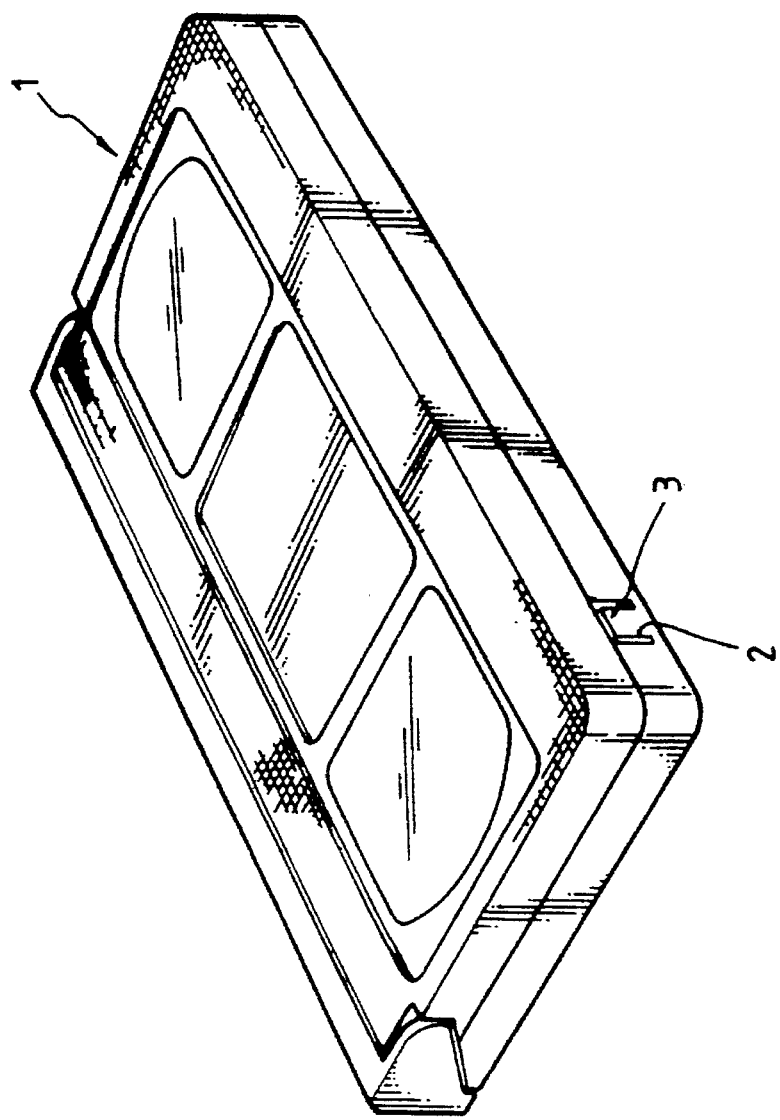
FIG. 1 is a perspective view showing an outer appearance of a video tape cassette.
Figure 2:
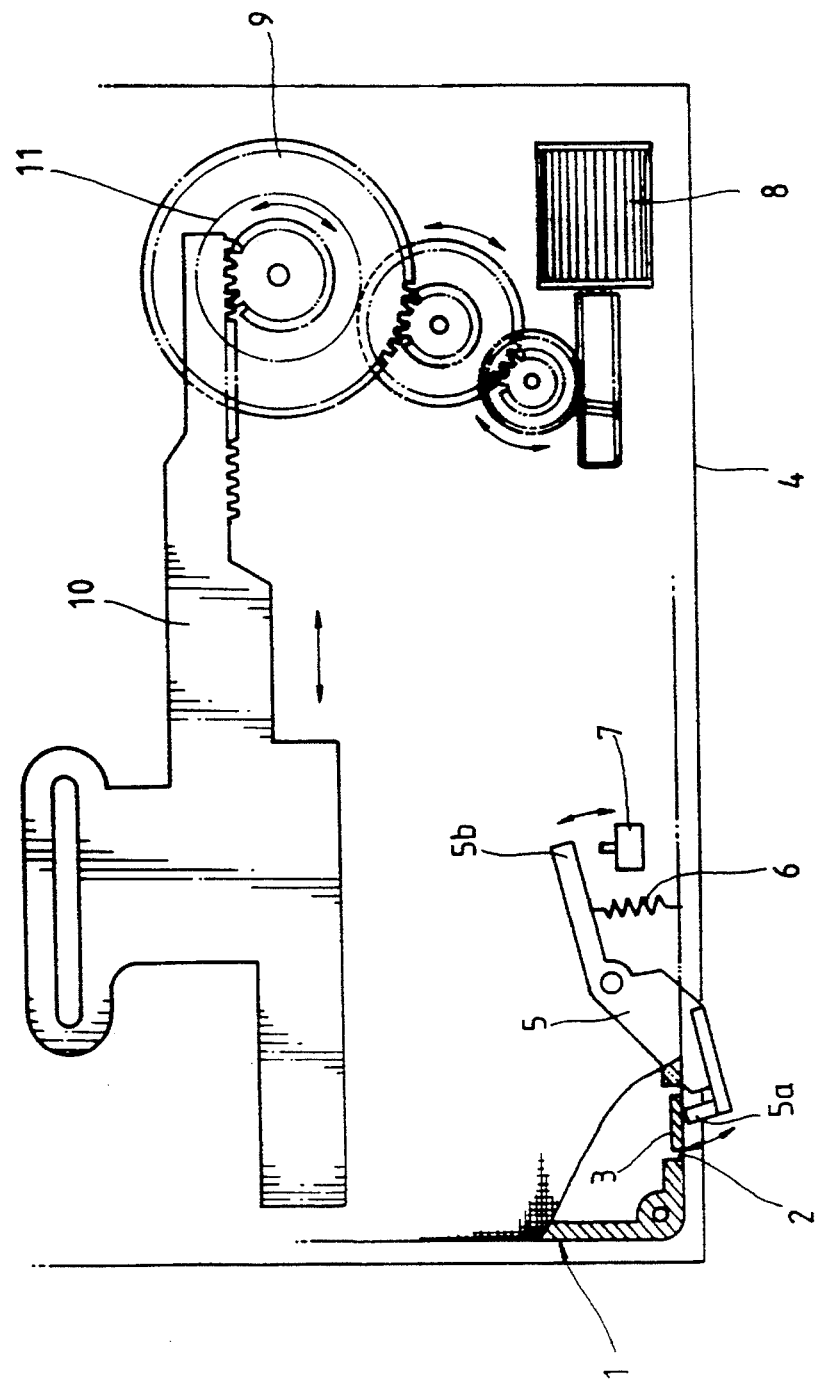
FIG. 2 is a plan view illustrating an erase-prevention sensing function and a mode detecting function of a deck mechanism of a conventional video tape cassette player.

According to the present invention, an operation mode of a deck mechanism can be discriminated by the single switching element 15', and also the recordability of the tape cassette loaded onto deck 4' can be sensed. Though the conventional device of FIG. 2 uses two separate switches for detecting an operation mode of a player and sensing an erase-prevention tab of a cassette tape, the present invention employs one switch so as to reduce the number of parts constituting a deck mechanism. Thus, the working time can be reduced due to the reduced parts, to thereby contribute to cost reduction.

It is contemplated that numerous modifications may be made to the detector of the present invention without departing from the spirit and scope of the invention as defined in the following claims.

What is claimed is:

1. An apparatus for detecting an operation mode of a tape cassette player having a slide member moving so as to change the operation mode, and for detecting a tape cassette having a removable erase-prevention tab so as to perform a predetermined function in accordance with a selected operation mode, said apparatus comprising:

a switching element for generating a switching signal;

first operating means for operating said switching element by the slide member so that said switching element generates a first signal by which the operation mode is discriminated; and second operating means for operating said switching element by the erase-prevention tab so that said switching element generates a second signal for detecting whether the erase-prevention tab is present, wherein said first operating means comprises a cam plate that moves with the slide member in a moving direction and has an extended cam groove formed so as to have variable positions perpendicular to the moving direction, and a switching arm member having an end portion inserted into the cam groove so as to become interlocked with said cam plate, and which is coupled with said switching element so as to operate said switching element according to the movement of said cam plate.

2. The apparatus according to claim 1, wherein said slide member is formed integrally with said cam plate.

3. An apparatus for detecting an operation mode of a tape cassette player having a slide member moving so as to change the operation mode, and for detecting a tape cassette having a removable erase-prevention tab so as to perform a predetermined function in accordance with a selected operation mode, said apparatus comprising:

a switching element for generating a switching signal;

first operating means for operating said switching element by the slide member so that said switching element generates a first signal by which the operation mode is discriminated; and second operating means for operating said switching element by the erase-prevention tab so that said switching element generates a second signal for detecting whether the erase-prevention tab is present, wherein said second operating means comprises a sensor lever having a protruding portion that contacts the erase-prevention tab and which is pivotally supported so as to pivot depending on whether or not the erase-prevention tab is present, and a switching arm member coupled to said switching element so that said switching arm member can be interlocked with said sensor lever so as to operate said switching element.

4. The apparatus according to claim 3, wherein said switching arm member is kept from moving toward said sensor lever while being allowed to freely move in an opposite direction.

5. An apparatus for detecting an operation mode of a tape cassette player having a slide member moving so as to change the operation mode, and for detecting a tape cassette having a removable erase-prevention tab so as to perform a predetermined function in accordance with a selected operation mode, said apparatus comprising:

a cam plate which moves with the slide member and which has an elongated cam groove including variable positions for discriminating a state of the player depending on a movement distance of said cam plate, said elongated cam groove including an extended groove portion formed so as to allow another variable position in a predetermined area of said elongated cam groove;

a switching element having a switching arm member engaged with said elongated cam groove of said cam plate to rotate so that said switching element generates a switching signal depending on the movement of said elongated cam groove; and a sensor lever having a protruding portion and an extending portion respectively contacting the erase-prevention tab and said switching arm member, said sensor lever being pivotally mounted, wherein said protruding portion pivots so as to contact with the erase-prevention tab if the erase-prevention tab is present and said extending portion moves according to the pivoting of said protruding portion so as to restrict the movement of said switching arm member of said switching element in at least one direction.

\* \* \* \* \*